Dec. 7, 1954     O. MITCHELL     2,696,070
COTTON PICKER AND WIPER ASSEMBLY
Filed Oct. 2, 1950     3 Sheets-Sheet 1
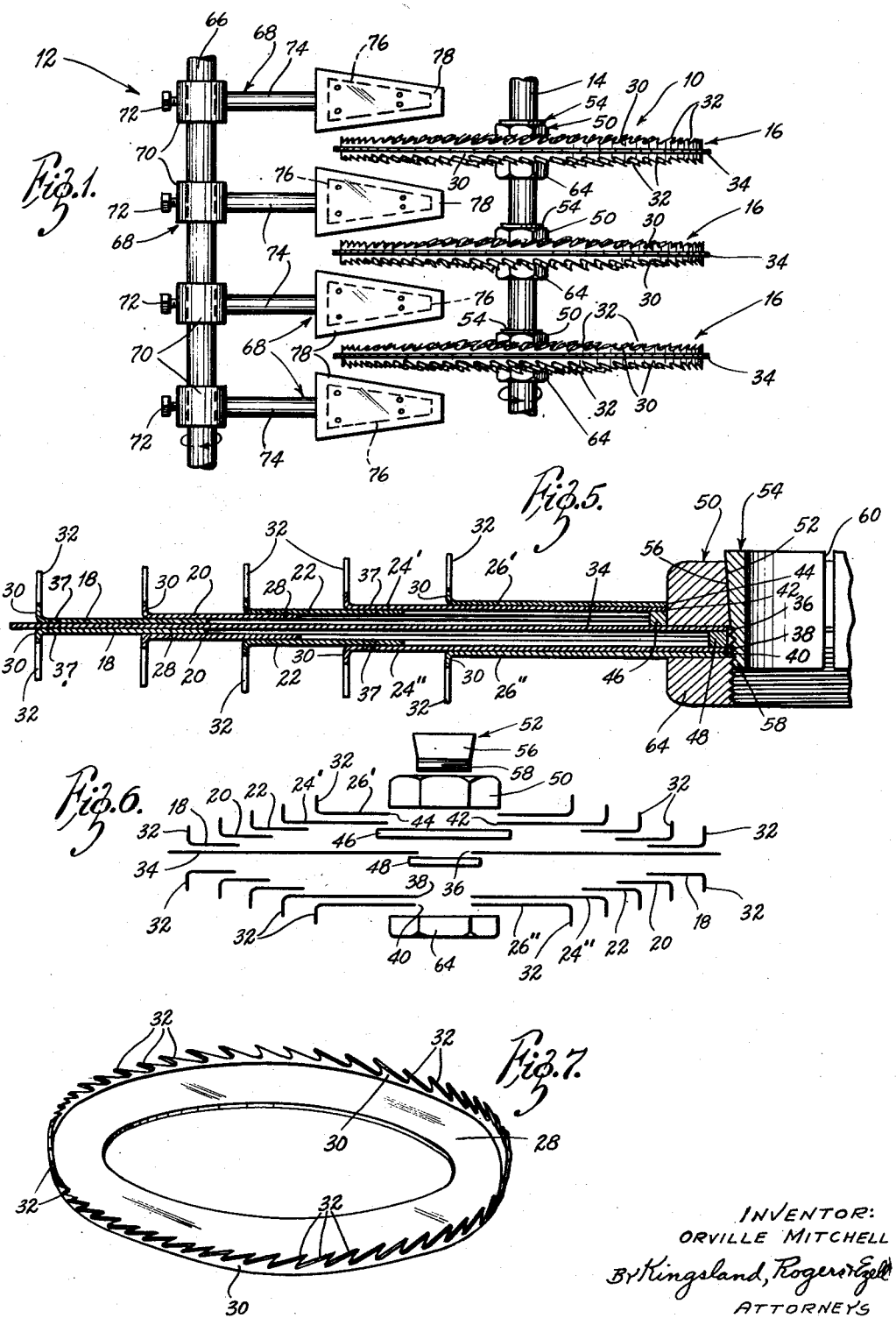
INVENTOR:
ORVILLE MITCHELL
By Kingsland, Rogers & Ezell
ATTORNEYS Dec. 7, 1954   O. MITCHELL   2,696,070
COTTON PICKER AND WIPER ASSEMBLY
Filed Oct. 2, 1950   3 Sheets-Sheet 2
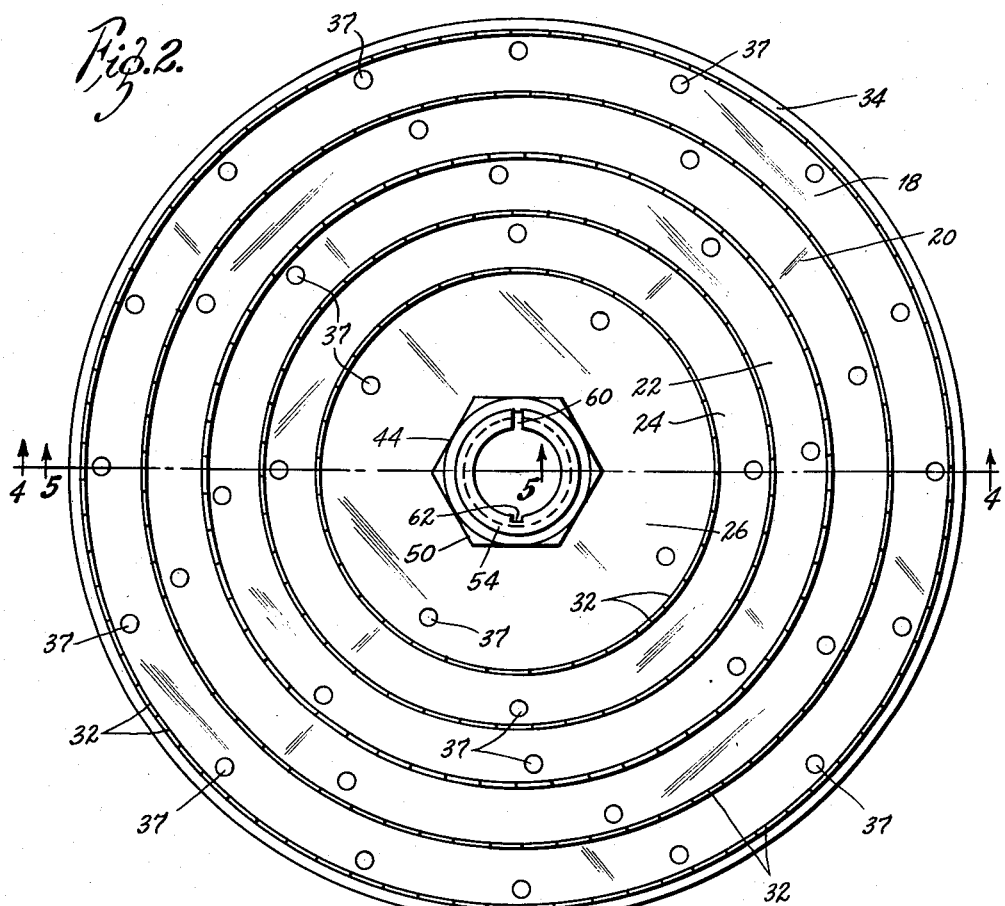
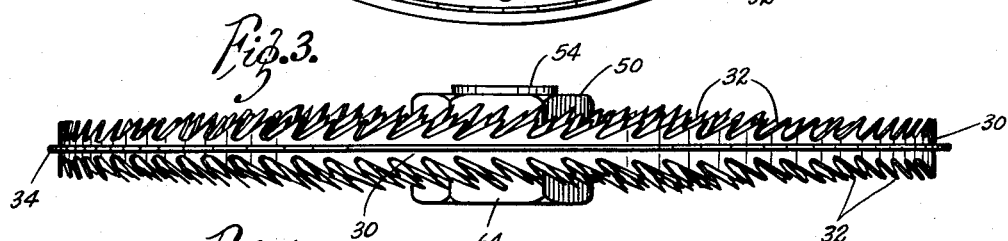
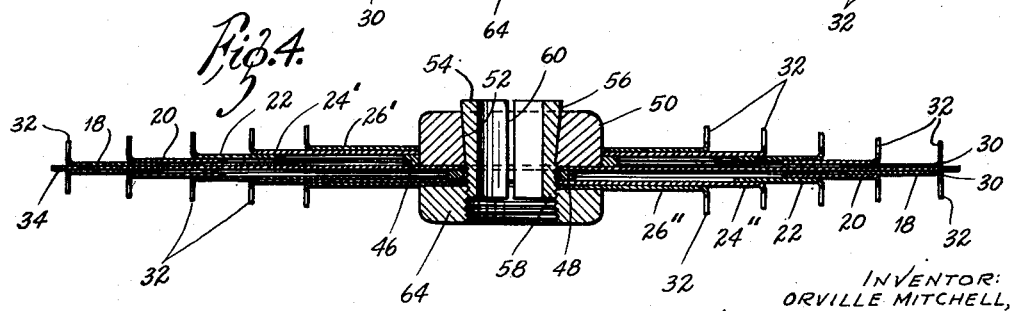
INVENTOR:
ORVILLE MITCHELL,
BY Kingsland, Rogers + Ezell
ATTORNEYS Dec. 7, 1954      O. MITCHELL      2,696,070
COTTON PICKER AND WIPER ASSEMBLY
Filed Oct. 2, 1950      3 Sheets-Sheet 3
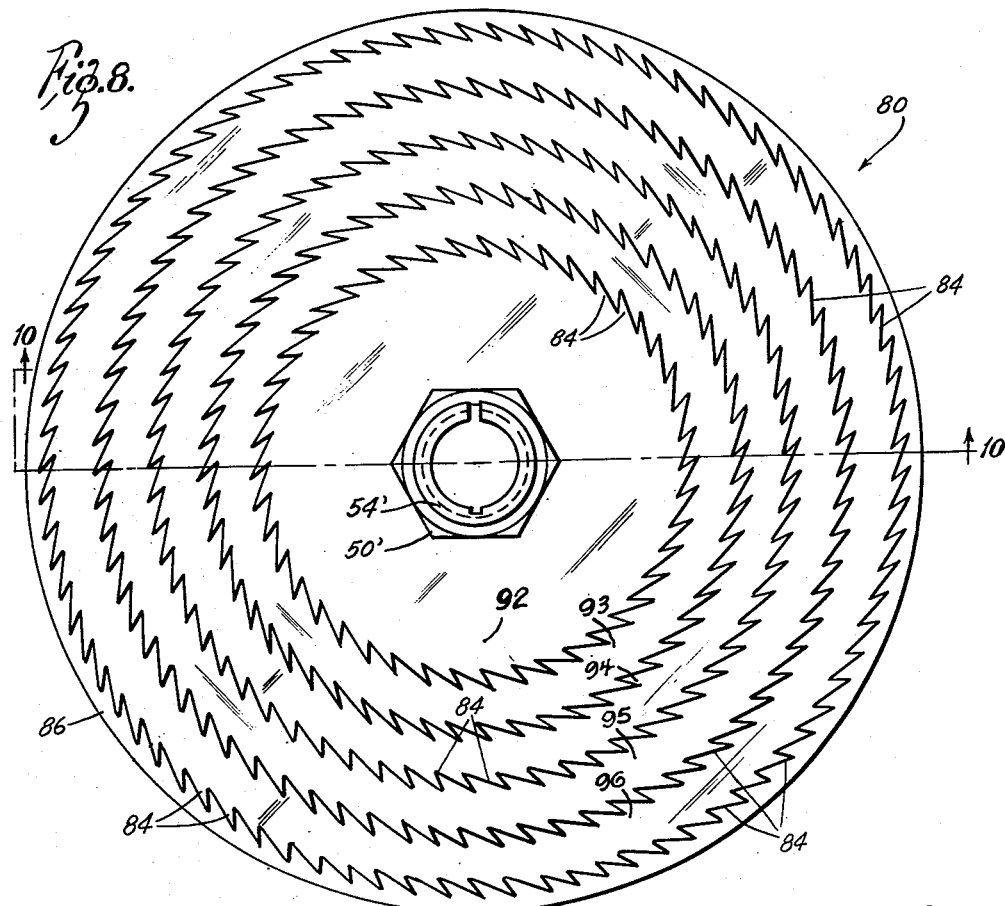
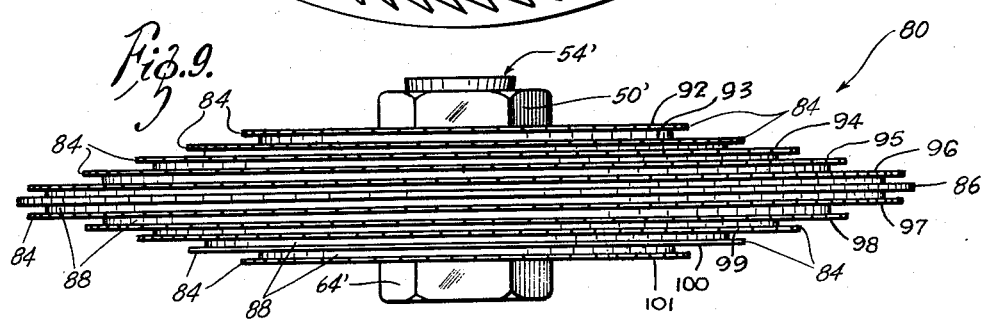
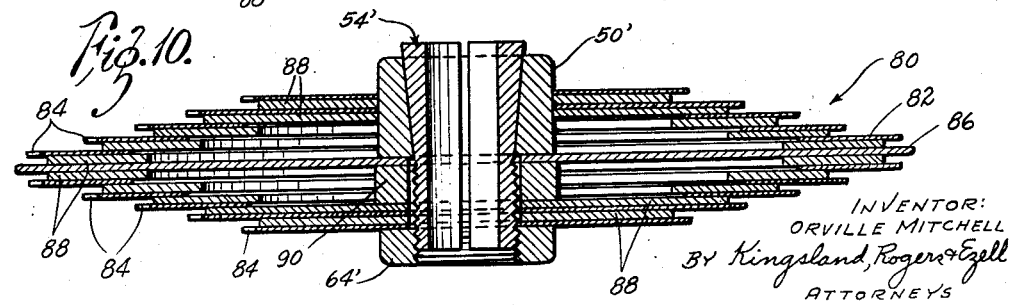
INVENTOR:
ORVILLE MITCHELL
BY Kingsland, Rogers & Ezell
ATTORNEYS

United States Patent Office 2,696,070
Patented Dec. 7, 1954

2,696,070

COTTON PICKER AND WIPER ASSEMBLY

Orville Mitchell, Dallas, Tex., assignor to John E. Mitchell Company, Dallas, Tex., a corporation of Missouri Application October 2, 1950, Serial No. 187,937

14 Claims. (Cl. 56—48)

The present invention relates generally to the cotton harvesting art and more particularly to a novel combination picker and wiper assembly for use with mechanical harvesters.

In one form, the invention includes a pair of parallel rotatably-mounted shafts. One shaft contains a series of spaced disc-like members adjustably mounted thereon which have concentric rows of saw-like teeth on each side thereof. The elements supporting the teeth are built up in step-like fashion on a supporting plate so that the distance between opposed teeth on adjacent disc-like members decreases progressively toward the center of the disc-like members. The other shaft contains a series of elongated wiper arms containing tapered wiper plates adjacent their free ends which extend between the saw-like teeth of the discs for wiping the picked cotton from them and into a receiver.

As is well known in the art, there is a wide variation in the size of cotton bolls and locks on the cotton plants. This difference in size even exists to some extent on the same cotton plant. Cotton picker assemblies employing spaced discs having projections of one form or another extending therefrom have been used for many years, but none of these constructions appears to have been devised to take care of this variation in the size of the cotton bolls and locks. With the picker assemblies in use at the present time there is no variation in the distance between the projections on opposed disc-like members. Thus, the small locks often pass between them without being engaged, whereas the larger locks cannot enter the space between adjacent members and are brushed aside by their outer edges.

It is an object of the present invention, therefore, to provide a novel cotton picker assembly which accommodates cotton bolls and locks of various sizes so as to more efficiently strip the cotton from the plants. More particularly, it is an object to provide a picker assembly containing spaced disc-like members constructed so that the distance between the projections on opposed members decreases progressively from the periphery toward the centers thereof. Specifically, it is an object to provide a picker assembly disc-like member which is built up of a series of pairs of concentric annular members having saw-like teeth at their peripheries so that the member is relatively thick at its center and relatively thin at its periphery.

Another object of the present invention is to provide a wiping mechanism for removing the cotton from the picker members. More particularly, it is an object to provide a series of spaced rotatably mounted arm-like members, each containing a tapered pad of resilient material adjacent its free end to wipe the cotton from the teeth of the cotton picker members.

Another object is to provide a picker member which is of rugged construction and which is simple in design and relatively inexpensive to manufacture.

Further objects and advantages of the present invention will be apparent from the following description, reference being had to the accompanying drawings wherein a preferred embodiment of the present invention is shown, in which:

Fig. 1 is an elevational view of a portion of one form of combination picker and wiper assembly embodying the teachings of the present invention;

Fig. 2 is an enlarged top plan view of the picker member;

Fig. 3 is a vertical elevational view of the picker member shown in Fig. 2;

Fig. 4 is a diametrical sectional view taken on the line 4—4 in Fig. 2;

Fig. 5 is an enlarged fragmentary vertical sectional view taken on the line 5—5 in Fig. 2;

Fig. 6 is an exploded schematic view of the picker member;

Fig. 7 is a perspective view of one of the individual picker member elements;

Fig. 8 is a top plan view of a modified picker member;

Fig. 9 is a vertical elevational view of the modified picker member; and

Fig. 10 is a vertical diametrical sectional view of the modified picker member taken on the line 10—10 in Fig. 8.

Referring to the drawings more particularly by reference numerals, specifically Fig. 1, 10 and 12 indicate generally a picker assembly and a wiper assembly, respectively, constructed in accordance with the teachings of the present invention.

The picker assembly 10 includes a shaft 14 on which is adjustably mounted a plurality of disc-like picker members 16, in spaced relationship.

Each picker member 16 is built up by fastening together, as by spot welding, a series of pairs of concentric annular elements 18, 20, 22, 24', 24", 26' and 26", of the general shape shown in Fig. 7 so as to form a stepped disc-like support element having saw-like teeth or projections 32 thereon. Each of said elements is preferably made from sheet steel and contains a flat annular body portion 28 and a flange-like portion 30 formed normal thereto at its outer periphery. The flange-like portion 30 contains a series of saw-like teeth or projections 32 which are inclined at an angle to the body portion 28 for a purpose to appear.

A flat plate-like base element 34 having an opening 36 at its center forms a base for the elements 18, 20, 22, 24', 24", 26' and 26". As shown in Figs. 4 and 5, the largest two elements 18 are fastened to opposite sides of the flat plate-like element 34 adjacent its outer edge, by spot welding 37. Fastened to the body portions of the elements 18 adjacent their inner edges, as by welding, are the next largest elements 20. In like manner, the elements 22 are fastened to the elements 20, the elements 24' and 24" are fastened to the elements 22, and the elements 26' and 26" are fastened to the elements 24' and 24", respectively. Thus, there is provided a series of concentric rings of teeth on opposite sides of the base element 34, the distance between the tips of opposed teeth on opposite sides of the members 16 increasing progressively toward the center of the picker member 16. If desirable, the vertical distance between the adjacent rows of teeth can be increased in any desired manner, such as by the use of spacing members between the teeth elements.

The elements 18, 20 and 22 have the inner edges of their body portions spaced from the center of the assembly to conserve material and to decrease the weight of the device. Manifestly, these edges could be extended inwardly to adjacent the center of the member.

The inner edges of the bottom elements 24" and 26" (Fig. 5) extend inwardly the same distance as the base element 34 and define openings 38 and 40, respectively, which are in alignment with, and of the same size as, the opening 36. The upper elements 24' and 26' (Fig. 5) contain aligned hexagonal-shaped openings 42 and 44, respectively, at their centers, for a purpose to appear.

One ring-like spacer member 46 is disposed between the upper elements 24' and 26' and the base elements 34, and another ring-like spacer member 48 is disposed between the lower elements 24" and 26" and the base element 34.

Each picker member 16 is adjustably fastened to the shaft 14 in a manner which will now be described. A hub member 50 having a hexagonal shaped outer surface and a tapered inner surface 52 is disposed in the openings 44 and 42 so as to rest on the base element 34 about the opening 36. Because of the shape of the hub member 50 and the shape of the openings 42 and 44, the former is prevented from rotating relative to the upper elements 24' and 26', and, therefore, is also prevented from rotating relative to the member 16.

A tubular adaptor 54 having a tapered outer surface 56 and a threaded bottom portion 58 is disposed within the hub member 50 so as to extend through the openings 36, 38 and 40 and to protrude beyond the lower element 26''. As shown best in Fig. 2, the adaptor 54 contains a vertical slit 60 in one side, and a vertical groove 62 in its inner surface diametrically opposite to the slit 60. This permits the two halves defined by the slit and groove to be drawn together so as to decrease the inner diameter of the adaptor 54.

A nut 64 is threadedly disposed on the threaded bottom portion 58 of the adaptor 54 so as to abut the bottom element 26''.

Thus, when the nut 64 is rotated in one direction relative to the adaptor 54, the latter is pulled downwardly through the hub 50 so as to cause its tapered outer surface 56 to slide on the tapered inner surface 52 of the hub 50, thereby decreasing the inner diameter of the adaptor 54 so as to cause it to grip the shaft 14 more tightly. Conversely, when the nut 64 is rotated in the opposite direction relative to the adaptor 54, the latter expands so that the picker members 16 can be easily slid along the shaft 14.

The wiper assembly 12 (Fig. 1) includes a shaft 66 on which is adjustably mounted a plurality of spaced wiper arms 68.

Each wiper arm 68 includes a hub 70 which contains a setscrew 72 for maintaining the wiper arms 68 in selected spaced position on the shaft 66.

A rod-like element 74 extends from the hub 70, and fixedly mounted at its free end is a tapered wiper support 76. Mounted on the wiper support 76, as by riveting, is a tapered wiper plate 78 of resilient material such as rubber.

As shown in Fig. 1, the wiper assembly 12 is disposed adjacent the picker assembly 10 so that the wiper plate 78 extends between the picker members 16 and adjacent the tips of the teeth 32.

Referring specifically to Figs. 8–10, the numeral 80 indicates generally a modified form of picker member which may be used with the wiper shown in Fig. 1 and which differs from the picker member 16 in that its teeth extend radially outwardly from the outer peripheries of the elements instead of being normal thereto. This type of construction has been found to be more advantageous with certain types of cotton plants.

The picker member 80 is built up of a series of flat annular elements 92 to 101, each of which contains a plurality of teeth 84 at their outer peripheries, the teeth lying in the plane of the element and being inclined at an angle to radial lines passing through its center.

The elements 92 to 101 are built outwardly from a flat annular plate-like base member 86 which has a smooth outer periphery. As in the construction shown in Figs. 2–4, the elements 92 to 101 of the modified picker member 80 decrease in size outwardly from the base member 86.

Ring-like spacer members 88 are disposed between the annular elements 92 to 101 adjacent their peripheries, but inwardly of the teeth 84, to provide vertical clearance between the teeth.

The construction for adjustably fastening the modified picker members 80 to the shaft 14 is similar to that described previously with respect to the picker member 16 and includes a hub member 50', a tubular adaptor 54' and a nut 64'.

A cylindrical spacer member 90 is disposed about the tubular adaptor 54' between the base member 86 and one of the lower ring-like spacer members 88 to prevent the annular elements 92 to 101 from being collapsed adjacent the center of the picker member when the nut 64' is tightened.

*Operation*

In one type of cotton harvester employing the invention described herein, there are fourteen picker members 16 (or 80) mounted on each vertical shaft 14, and there are two picker assemblies 10 and one wiper assembly 12 on each side of the row of cotton plants being picked. Usually one wiper assembly 12 is used with each two picker assemblies 10, but, manifestly, one wiper assembly could be used with each picker assembly.

Any suitable mechanism can be employed for moving the harvester through the cotton field and for rotating the picker assembly shafts 14 and the wiper assembly shafts 66.

The picker members 16 (or 80) are positioned on the shaft 14 so that the saw-like teeth 32 (or 84) on the side adjacent the plants, extend rearwardly relative to the direction of travel of the harvester down the row of plants. Also, the direction of rotation of the shaft 14 is such as to cause rotation of the disc-like members 16 (or 80) in the direction in which the saw-like teeth 32 (or 84) are inclined.

As the harvester moves down the row of cotton plants, the cotton locks enter the picker members 16 (80) at the forward portion of their peripheries where the space between opposed picker members 16 (80) is the greatest. If the lock is large enough, it will be caught up by the saw-like teeth 32 (84) adjacent the outer peripheries of the members 16 (80) and carried around to the other sides of the members 16 (80). If the lock is too small to be engaged by the teeth adjacent the periphery, the forward motion of the harvester will cause the lock to move deeper into the space between the picker members 16 (80) where the teeth are spaced closer together until, eventually, it will be engaged by either the teeth above or the teeth below, or both, removed from the plant and carried around to the other sides of the members 16 (80).

The wiper assembly 12, which is positioned adjacent the picker assemblies 10, rotates in the direction opposite to the picker members 16 (80) (as indicated by the arrows in Fig. 1) at a slightly faster speed. Therefore, the wiper plates 78 wipe over the teeth 32 (84) in the same direction in which they extend, and because they are traveling faster than the teeth, they wipe the cotton from the teeth and cause it to fall into a receptacle, from which it is removed by suction, and blown into a large screen container.

Thus, it is apparent that there has been provided a novel combination picker and wiper assembly which fulfills all of the objects and advantages sought therefor. The distance between the teeth on adjacent disc-like picker members 16 (80) decreases progressively toward the center of the members so that both small and large locks can be accommodated by the picker assembly and be stripped from the cotton plants. Also, the picker members 16 (80) are of rugged and simple construction and can be fabricated at relatively low cost because of the simple manner in which they are built up of similarly shaped elements by spot welding the elements together on each side of the base plate.

It is to be understood that the foregoing description and the accompanying drawings have been given only by way of illustration and example, and that changes and alterations in the present disclosure, which will be readily apparent to one skilled in the art, are contemplated as within the scope of the present invention, which is limited only by the claims which follow.

What is claimed is:

1. A device of the type described, comprising, in combination, a first shaft; a series of separate disc-like cotton picker members mounted in spaced relationship along said shaft for rotation therewith, the picker members having a plurality of projections extending therefrom and inclined at an angle thereto, the projections being disposed on facing sides of adjacent members in corresponding positions with certain of them located at different distances from the shaft, the axial distance between opposed projections on adjacent picker members decreasing progressively from the periphery of the picker members toward the shaft; a second shaft parallel with the first shaft; and a series of elongated wiper members mounted on the second shaft so as to extend between the picker members, each wiper member containing a relatively flat, tapered wiper adjacent its free end for removing picked cotton from the projections.

2. A device of the type described, comprising, in combination, a first shaft; a series of separate disc-like cotton picker members mounted in spaced relationship along said shaft for rotation therewith; the picker members having a plurality of projections extending therefrom, the projections being disposed on facing sides of adjacent members in corresponding positions with certain of them located at different distances from the shaft, the axial distance between opposed projections on adjacent picker members decreasing progressively from the periphery of the picker members toward the shaft; a second shaft parallel with the first shaft; and a series of elongated wiper members mounted on the second shaft so as to extend between the picker members, each wiper member containing a tapered, rubber wiper adjacent its free end for removing picked cotton from the projections.

3. A rotatable picker member for cotton harvesters, comprising a disc-like supporting element containing a plurality of projections extending from each side thereof, the distance of the ends of the projections from a plane passing through the center of the supporting element normal to its axis of rotation increasing progressively toward the center of the supporting element, the projections being inclined at an angle to the plane of the supporting element so as to extend in directions normal to lines passing radially through the axis of the supporting element.

4. A rotatable picker member for cotton harvesters, comprising a disc-like supporting element containing a plurality of projections extending from each side thereof, the projections being disposed in concentric circles of different diameters, the distance of the ends of the projections from a plane passing through the supporting element normal to its axis of rotation increasing progressively toward the center of the supporting element; the projections being inclined at an angle to the plane of the supporting element so as to extend in directions normal to lines passing radially through the axis of the supporting element.

5. A rotatable picker member for cotton harvesters, comprising a plate-like base element; a first projection-carrying element mounted immediately adjacent each side of the base element adjacent its periphery, each of said projection-carrying elements including a flat annular portion having a plurality of pointed projections at its outer edge; second projection-carrying elements similar in construction to the first projection-carrying elements, mounted outside of said first elements on the side away from the base element so that their projections are spaced from the projections of the first elements toward the center of the picker member; and additional projection-carrying elements mounted in like manner so as to provide a plurality of projections on each side of the base element in which the distance from the tips of the projections to the base element increases progressively toward the center of the member.

6. A rotatable picker member for cotton harvesters, comprising a plate-like base element; a first projection-carrying element mounted on each side of the base element adjacent its periphery, each of said projection-carrying elements including a flat annular portion having a plurality of pointed projections at its outer edge and inclined at an angle thereto; second projection-carrying elements similar in construction to the first projection-carrying element, fastened outside of said first elements on the side away from the supporting element so that their projections are spaced from the projections of the first elements toward the center of the picker member; and additional projection-carrying elements mounted in like manner on the preceding projection-supporting elements so as to provide a plurality of projections on each side of the base element in which the distance from the tips of the projections to the supporting element increases progressively toward the center of the member, said projections which are farthest from said member being at least about half the distance from the outer edge of the plate-like base to its axis.

7. A rotatable picker member for cotton harvesters, comprising a plate-like base element; a first projection-carrying element mounted on each side of the base element adjacent its periphery, each of said projection-carrying elements including a flat annular portion having a flange-like portion formed integral therewith at its outer periphery so as to extend substantially normal thereto, the flange-like portion containing a series of teeth inclined at an angle to the plane of the flat annular portion; second projection-carrying elements similar in construction to the first projection-carrying elements but having a smaller outer diameter, fastened outside of said first elements on each side of the supporting element so that their teeth are spaced inwardly from the teeth of the first elements toward the center of the picker member and at a greater distance from the base element; and additional projection-carrying elements mounted in like manner on the preceding elements so as to provide a series of teeth extending from each side of the base element in concentric circles in which the distance from the tips of the teeth in each circle to the base element increases progressively toward the center of the member.

8. A rotatable picker member for cotton harvesters, comprising a plate-like base element; a first projection-carrying element mounted on each side of the base element at its periphery, each of said projection-carrying elements including a flat annular portion containing a plurality of teeth at its outer periphery which lie in the plane of the element; second projection-carrying elements similar in construction to the first projection-carrying elements but having a smaller outer diameter, fastened outside of said first elements on the side away from the base element so that their teeth are spaced inwardly from the teeth of the first elements toward the center of the picker member; and additional projection-carrying elements mounted in like manner on the preceding elements so as to provide a series of teeth on each side of the base element in concentric circles in which the distance from the tips of the teeth in each circle to the supporting element increases progressively toward the center of the member.

9. A rotatable picker member for cotton harvesters, comprising a plate-like base element; a first projection-carrying element mounted on each side of the base element at its periphery, each of said projection-carrying elements including a flat annular portion containing a plurality of teeth at its outer periphery which lie in the plane of the element, said teeth being inclined uniformly to the annular portion at an angle other than normal thereto; second projection-carrying elements similar in construction to the first projection-carrying elements but having a smaller outer diameter, fastened outside of said first elements on the side away from the base element so that their teeth are spaced inwardly from the teeth of the first elements toward the center of the picker member; additional projection-carrying elements mounted in like manner on the preceding elements so as to provide a series of teeth on each side of the base element in concentric circles in which the distance from the tips of the teeth in each circle to the base element increases progressively toward the center of the member, said teeth which are farthest from said member being at least about half the distance from the outer edge of the plate-like base to its axis; and spacer members between the projection-carrying elements to increase the vertical distance between the rows of teeth.

10. A rotatable picker member for cotton harvesters, comprising a disc-like supporting element containing a plurality of projections on each side thereof, the distance of the ends of the projections from a plane passing through the center of the supporting element normal to its axis of rotation increasing progressively toward said axis of the supporting element; said supporting element being provided with an opening having side walls at its center; and means disposed in the opening for adjustably mounting the picker member on a shaft including an adaptor sleeve having a side wall, the upper portion of the outer surface of the side wall being tapered and the lower portion thereof containing external threads, a vertically extending slot in the side wall, a tubular hub member having a tapered inner surface disposed about the upper portion of the adaptor sleeve, means on the hub member in engagement with the side walls of the opening preventing rotation of the hub member relative to the supporting element, and a nut threadedly engaged with the threaded bottom portion of the adaptor sleeve.

11. A rotatable picker member for cotton harvesters, comprising a disc-like supporting element containing a plurality of pointed projections on each side thereof, said disc-like supporting element comprising a series of stepped concentric elements with said projections at the outer extremity thereof, the distance of the pointed ends of the projections on both sides of said disc-like supporting element from a plane passing through the center of the supporting element normal to its axis of rotation increasing progressively toward the center of the supporting element.

12. A rotatable picker member for cotton harvesters, comprising a disc-like supporting element containing a plurality of pointed projections on each side thereof, said disc-like supporting element comprising a series of stepped concentric elements with said projections at the ends thereof with the projections closest to the axis of the disc-like supporting member being about half the distance from the outer edge of said member to said axis, the distance of the pointed ends of the projections on both sides of said disc-like supporting element from a plane passing through the center of the supporting element normal to its axis of rotation increasing progressively toward the center of the supporting element; and means cooperating with said supporting element for adjustably mounting the picker member on a shaft for movement along it to any selected position.

13. A rotatable picker member for cotton harvesters, comprising a disc-like supporting element containing a plurality of pointed projections on each side thereof and inclined at an angle thereto, said disc-like supporting element comprisnig a series of stepped concentric elements with said projections at the ends thereof with the projections closest to the axis of the disc-like supporting member being about half the distance from the outer edge of said member to said axis, the projections being disposed in concentric circles of different diameters, the distance of the pointed ends of the projections on both sides of said disc-like supporting element from a plane passing through the supporting element normal to its axis of rotation increasing progressively toward the center of the supporting element.

14. A rotatable picker member for cotton harvesters, comprising a disc-like supporting element containing a plurality of projections on each side thereof, said supporting element being provided with an opening, and means disposed in the opening for adjustably mounting the picker member on a shaft including an adaptor sleeve having a side wall, the upper portion of the outer surface of the side wall being tapered and the lower portion thereof containing external threads, a vertically extending slot in the side wall, a tubular hub member having a tapered inner surface disposed about the upper portion of the adaptor sleeve, means on the hub member in engagement with the side walls of the opening preventing rotation of the hub member relative to the supporting element, and a nut threadedly engaged with the threaded bottom portion of the adaptor sleeve.

References Cited in the file of this patent

UNITED STATES PATENTS

| Number | Name | Date |
|---|---|---|
| 135,337 | Houston | Jan. 28, 1873 |
| 165,546 | Cook | July 13, 1875 |
| 189,815 | Tripp | Apr. 17, 1877 |
| 227,949 | Beekman | May 25, 1880 |
| 243,554 | Haselton | June 28, 1881 |
| 439,794 | Todd | Nov. 4, 1890 |
| 500,560 | Brown | July 4, 1893 |
| 555,691 | Gaskill | Mar. 3, 1896 |
| 647,818 | Dyer | Apr. 17, 1900 |
| 1,258,580 | Lassiter | Mar. 5, 1918 |
| 1,610,067 | O'Haver | Dec. 7, 1926 |
| 1,751,389 | Bledsoe, Jr. | Mar. 18, 1930 |
| 1,775,890 | Cruise | Sept. 16, 1930 |
| 1,828,534 | Johnston et al. | Oct. 20, 1931 |
| 1,942,405 | Basquin et al. | Jan. 9, 1934 |
| 2,333,965 | Weems | Nov. 9, 1943 |
| 2,462,800 | Berry | Feb. 22, 1949 |
| 2,577,367 | Rust | Dec. 4, 1951 |
| 2,619,784 | Paradise | Dec. 2, 1952 |